United States Patent Office 3,631,062
Patented Dec. 28, 1971

---

3,631,062
N'-SUBSTITUTED-6-NITROINDAZOLES
Pasquale P. Minieri, Woodside, N.Y., assignor to
Tenneco Chemicals, Inc.
No Drawing. Continuation-in-part of application Ser. No.
589,235, Oct. 25, 1966. This application Mar. 29, 1968,
Ser. No. 717,442
Int. Cl. C07d 49/18
U.S. Cl. 260—310 C  4 Claims

ABSTRACT OF THE DISCLOSURE

N'-sbustituted-6-nitroindazoles that have the structural formula

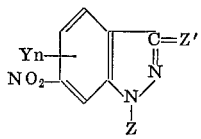

wherein Z represents $-S-(CHX)_m-CH_nX_{3-n}$ or $-SO_2R$; Z' represents hydrogen or halogen; Y represents lower alkyl, halogen, or nitro; X represents halogen; R represents phenyl, tolyl, or $-CH_nX_{3-n}$; $m$ is an integer in the range of zero to one; and $n$ is an integer in the range of zero to two can be used to control the growth of various plant and animal pests. Among the most active of these compounds is N'-trichloromethylmercapto-6-nitroindazole.

---

This is a continuation-in-part of my copending application Ser. No. 589,235, which was filed on Oct. 25, 1966.

This invention relates to certain N'-substituted-6-nitroindazoles and to the use of these compounds in the control of various plant and animal pests.

In accordance with this invention, it has been discovered that certain N'-substituted-6-nitroindazoles have unusual and valuable activity as fungicides, bactericides, insecticides, and herbicides. These compounds may be represented by the structural formula

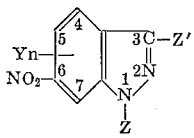

wherein Y represents an alkyl group having from 1 to 4 carbon atoms, —Cl, —Br, —F, —I, or —NO₂; Z represents either $-S-(CHX_m-CH_nX_{3-n}$ or $-SO_2R$; Z' represents —H, —Cl, —Br, —F, or —I; X represents —Cl, —Br, —F, or —I; R represents phenyl, tolyl, or the radical $-CH_nX_{3-n}$; $m$ represents an integer in the range of zero to one; and $n$ represents an integer in the range of zero to two.

Illustrative of the pesticidal compounds of this invention are the following:

N'-trichloromethylmercapto-6-nitroindazole,
N'-tetrachloroethylmercapto-6-nitroindazole,
N'-tribromomethylmercapto-6-nitroindazole,
N'-dichlorofluoromethylmercapto-6-nitroindazole,
N'-trichloromethylmercapto-3-chloro-6-nitroindazole,
N'-triiodomethylmercapto-5,6-dinitroindazole,
N'-trichloromethylmercapto-4-fluoro-6-nitroindazole,
N'-tribromomethylmercapto-3-iodo-4-methyl-6-nitroindazole,
N'-benzenesulfonyl-6-nitroindazole,
N'-(p-toluenesulfonyl)-3-chloro-6-nitroindazole,
N'-trichloromethylsulfonyl-4-methyl-6-nitroindazole,
and the like.

The novel N'-substituted-6-nitroindazoles may be prepared by any suitable and convenient procedure. For example, 6-nitroindazole or a 3-halo-6-nitroindazole may be heated as such or as an N'-amine salt with a compound that will react with it to form the desired N'-substituted-6-nitroindazole. Thus, 6-nitroindazole or 3-chloro-6-nitroindazole may be heated with trichloromethanesulfenyl chloride to form the corresponding N'-trichloromethylmercapto compounds. The reaction is generally carried out in a solvent, such as benzene, toluene, xylene, acetone, pyridine, ethanol, or ethylene dichloride, at the reflux temperature of the reaction mixture.

The biocidal compositions of this invention may be applied to a wide variety of fungi, bacteria, plants, insects, and other pests to control or inhibit their growth. While each of the N'-substituted-6-nitroindazoles has been found to be useful in the control of the growth of at least one of the aforementioned types of organisms, the particular pest upon which each exerts its major effect is largely dependent upon the nature of the substituents on the rings. For example, indazoles of the formula

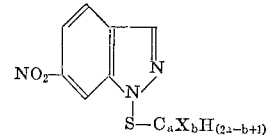

wherein $a$ is 1 or 2, $b$ is 3 when $a$ is 1 and is 4 when $a$ is 2, and X is halogen of atomic number from 17 to 35, are most effective as agricultural fungicides, while N'-(p-toluenesulfonyl)-6-nitroindazole is most useful as a selective herbicide.

The locus in which pest control is to be effected may, if desired, be treated with the compounds of this invention. Alternatively, the compounds may be applied directly to the undesirable organisms to control or inhibit their growth.

While the N'-substituted-6-nitroindazoles may be used as such in the processes of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fullers earth, talc, diatomaceous earth, hydrated calcium silicate, kaolin, and the like, to form dry particulate compositions. Such composition may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the pesticide in the compositions may vary within wide limits and depends upon a number of factors, the most important of which are the type or types of organisms being treated and the rate at which the composition is to be applied. In most cases the composition contains approximately 0.1% to 85% by weight of one or more of the aforementioned N'-substituted-6-nitroindazoles. If desired, the compositions may also contain other fungicides, such as sulfur, the metal dimethyl dithiocarbamates, and the metal ethylene bis (dithiocarbamates); insecticides, such as Chlordane, benzene hexachloride, and DDT; or plant nutrients, such as urea, ammonium nitrate, and potash.

The amount of the composition used is that which will bring about satisfactory control of the growth of the organism. To achieve control of fungi, insects, and bacteria, for example, an amount of the composition that is used is that which will apply to the locus or to the organism about 50 p.p.m. to 10,000 p.p.m. of the active compound since these amounts will ordinarily control the pest without injuring plants. Herbicidal compositions are generally used in amounts that will apply about 1 pound to 20 pounds of the active compound per acre.

The invention is further illustrated by the examples that follow.

EXAMPLE 1

To a mixture of 28.5 grams of 6-nitroindazole, 17.7 grams of triethylamine, and 250 ml. of benzene which was being heated at its reflux temperature was added over a period of 40 minutes 34.4 grams of trichloromethanesulfenyl chloride. The resulting mixture was heated at its reflux temperature for 2.5 hours, cooled to room temperature, and filtered. The filtrate was washed with two 100 ml. portions of water and then heated to remove the benzene. After crystallization from ligroin, there was obtained 31 grams of N'-trichloromethylmercapto-6-nitroindazole which melted at 105°–9° C. and which contained 33.3% Cl (calculated for $C_8H_4N_3O_2SCl_3$, 34.1% Cl).

EXAMPLE 2

To a mixture of 34.8 grams (0.175 mole) of 3-chloro-6-nitroindazole, 17.7 grams (0.175 mole) of triethylamine, and 250 ml. of benzene which was being heated at its reflux temperature was added over a period of 40 minutes 34.4 grams (0.175 mole) of trichloromethanesulfenyl chloride. The resulting mixture was heated at its reflux temperature for 2.5 hours, cooled to room temperature, and filtered. The filtrate was washed with three 100 ml. portions of water and then heated to remove the benzene. Upon recrystallization from ethanol, there was obtained 33.5 grams of N'-trichloromethylmercapto-3-chloro-6-nitroindazole, which melted at 133°–36° C. and which contained 12.6% N and 40.2% Cl (calculated for $C_8H_3N_3O_2SCl_4$, 12.1% N and 40.9% Cl).

EXAMPLE 3

To a mixture of 24.5 grams (0.15 mole) of 6-nitroindazole and 15.9 grams (0.158 mole) of triethylamine in 200 ml. of benzene which was being heated at its reflux temperature was added over a period of one hour a solution of 35.2 grams (0.15 mole) of 1,3,3,3-tetrachloroethylsulfenyl chloride-1 in 200 ml. of benzene. The resulting mixture was heated at its reflux temperature for 2.5 hours and cooled to room temperature. The solution was treated with 5 grams of activated carbon and 5 grams of filter aid and then filtered. The filtrate was washed with water and then heated to remove the benzene. There was obtained 18.5 grams of N'-1,2,2-tetrachloroethylmercapto)-6-nitroindazole which melted at 177°–80° C.

EXAMPLE 4

To a mixture of 32.6 grams of 6-nitroindazole, 20.2 grams of triethylamine, and 250 ml. of benzene which was being heated at its reflux temperature was added over a period of 45 minutes a mixture of 39.7 grams of p-toluenesulfonyl chloride in 100 ml. of benzene. The resulting mixture was heated at its reflux temperature for 105 minutes, cooled to room temperature, and allowed to stand overnight. It was then heated to its reflux temperature and filtered. The solid product was washed with water and dried under reduced pressure. There was obtained 34.0 grams of N'-(p-toluenesulfonyl)-6-nitroindazole, which melted at 195°–201° C. and which contained 13.12% N and 10.0% S (calculated for $C_{14}H_{11}N_3SO_4$, 13.2% N and 10.1% S).

EXAMPLE 5

To a mixture of 32.6 grams (0.2 mole) of 6-nitroindazole, 20.5 grams (0.2 mole) of triethylamine, and 250 ml. of benzene which was being heated at its reflux temperature was added over a period of 45 minutes a solution of 44 grams (0.2 mole) of trichloromethylsulfonyl chloride in 100 ml. of benzene. The resulting mixture was heated at its reflux temperature for 5 hours, cooled to room temperature, and filtered. The solid material was extracted with six 200 ml. portions of water. The aqueous extracts were cooled and filtered. After drying under reduced pressure, there was obtained 16.5 grams of N-(trichloromethylsulfonyl)-6-nitroindazole which melted at 177°–78° C.

EXAMPLE 6

Acetone solutions were prepared by dissolving 100 mg. portions of the products of Examples 1–5 in 10 ml. of acetone that contained 200 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form aqueous solutions that contained 1000 p.p.m. of the N'-substituted-6-nitroindazole. More dilute solutions were prepared by adding distilled water to these solutions.

EXAMPLE 7

N' - trichloromethylmercapto - 6 - nitroindazole was evaluated as an agricultural fungicide by means of the following tests:

(A) Tomato plants that were 6–8 inches tall were sprayed until the liquid dripped from the leaves with an aqueous solution prepared by the procedure of Example 6. When the plants had dried, they were sprayed with a suspension of spores of the tomato late blight fungus *Phytophthora infestans*. One week after treatment the degree of suppression of the disease was noted. The results obtained are summarized in Table I.

(B) Cheyenne wheat plants that were 6–8 inches tall were sprayed until the liquid dripped from the plants with an aqueous solution prepared by the procedure of Example 6. When the plants had dried, they were sprayed with a suspension of spores of wheat leaf rust disease *Puccinia rubigo-vera*. Ten days after treatment the degree of suppression of the disease was noted. The results obtained are summarized in Table I.

(C) Cucumber plants that were 6–8 inches tall were sprayed until the liquid dripped from the plants with an aqueous solution prepared by the procedure of Example 6. When the plants had dried, they were sprayed with a suspension of spores of powdery mildew disease *Erypiphe cichoracearum*. Ten days after treatment the degree of suppression of the disease was noted. The results obtained are summarized in Table I.

TABLE I

The effectiveness of N'-trichloromethylmercapto-6-nitroindazole as an agricultural fungicide

| Concentration of fungicide in solution (p.p.m.) | Percent control of— | | | |
| --- | --- | --- | --- | --- |
| | Late blight of tomatoes | Wheat leaf rust | Powdery mildew of cucumber | Phytotoxicity |
| 1,000 | 100 | 98 | 89 | Very slight. |
| 500 | 100 | 96 | 76 | None. |
| 100 | 100 | 0 | 48 | Do. |
| 10 | 80 | | | Do. |

EXAMPLE 8

An aqueous solution prepared according to the procedure of Example 6 and that contained 100 p.p.m. of N'-trichloromethylmercapto-6-nitroindazole was applied to soil infested with *Pythium aphanidermatum*. Ten days after treatment, an 86 percent control of *P. aphanidermatum* was noted.

EXAMPLE 9

A series of tests was carried out in which the products of Examples 1 and 4 were evaluated as herbicides. In these tests groups of flats containing seedlings of various plant species were sprayed with aqueous solutions prepared according to the procedure of Example 6. The reults of the tests were observed 14 days after the application of the test compounds and are reported in Table II. In this table a rating of "0" indicates no effect; "1" to "3" indicates slight injury; "4" to "6" indicates moderate injury; "7" to "9" indicates severe injury; and "10" indicates that all of the plants were killed.

TABLE II
Herbicidal activity of N'-substituted-6-nitroindazoles

| Plant species | Dosage, lbs./acre | Herbicide Product of Ex. 1 | Herbicide Product of Ex. 4 |
|---|---|---|---|
| Clover | 10 | 3 | 6 |
| Soybeans | 10 | 3 | 0 |
| Corn | 10 | 5 | 0 |
| Oats | 10 | 0 | 6 |
| Mustard | 10 | 5 | 10 |
| Morning glory | 10 | 10 | 10 |
| Buckwheat | 10 | 10 | 9 |
| Rye grass | 10 | 0 | 0 |
| Crab grass | 10 | 10 | 8 |
| Yellow foxtail | 10 | 5 | 0 |

The terms and expressions which have been employed are used as terms of description and not of limitation. There is no intention in the use of such terms and expressions of excluding any equivalents of the features shown and described or portions thereof; it is recognized that various modifications are possible within the scope of the invention claimed.

What is claimed is:
1. An indazole of the formula

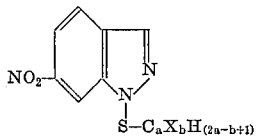

wherein $a$ is 1 or 2, $b$ is 3 when $a$ is 1 and is 4 when $a$ is 2, and X is halogen of atomic number from 17 to 35.

2. An indazole as set forth in claim 1 wherein $a$ is 1, $b$ is 3, and X is chlorine.

3. An indazole as set forth in claim 1 wherein $a$ is 2, $b$ is 4, and X is chlorine.

4. The indazole of the formula

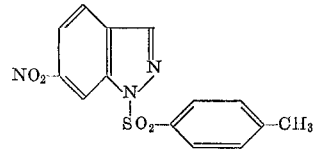

References Cited
UNITED STATES PATENTS

| | | | |
|---|---|---|---|
| 2,553,770 | 5/1951 | Kittleson | 260—309.5 |
| 2,553,775 | 5/1951 | Hawley et al. | 260—309.5 |
| 2,844,628 | 7/1958 | Kuhle et al. | 424—273 |
| 2,888,462 | 5/1959 | Cannon | 260—310 R |
| 3,178,447 | 4/1965 | Kohn | 260—309.5 |

OTHER REFERENCES

Auwers Chem. Abst., vol. 20, pages 762–3, (1926).
Schlager Chem. Abst., vol. 61, column 7003 (1964).

NATALIE TROUSOF, Primary Examiner

U.S. Cl. X.R.
71—82; 424—273